United States Patent [19] [11] Patent Number: 4,634,099
Danko et al. [45] Date of Patent: Jan. 6, 1987

[54] HIGH PRESSURE INVERTED BELLOWS VALVE

[75] Inventors: Oliver L. Danko, Chesterland; Carl R. Bork, Jr., Euclid; William C. Steiss, Parma; Donald A. Levengood, Silver Lake, all of Ohio

[73] Assignee: Nupro Company, Willoughby, Ohio

[21] Appl. No.: 735,807

[22] Filed: May 17, 1985

[51] Int. Cl.$^4$ ............................................. F16K 31/00
[52] U.S. Cl. ................................. 251/335.3; 251/86; 251/63.6; 251/214; 251/291
[58] Field of Search .................. 251/63.6, 85, 86, 291, 251/335 B, 214, DIG. 1

[56] References Cited

U.S. PATENT DOCUMENTS

| Re. 29,322 | 7/1977 | Nelson | 251/14 |
|---|---|---|---|
| 64,502 | 4/1867 | Wheelock | 92/55 |
| 1,906,313 | 5/1933 | Clifford | 251/335 B |
| 1,995,390 | 3/1935 | Hubbard | 251/61.4 |
| 2,249,258 | 7/1941 | Shaw | 137/156 |
| 2,331,503 | 10/1943 | Ray | 251/335 |
| 2,675,204 | 4/1954 | Johnson | 251/25 |
| 2,693,822 | 11/1954 | Gerow et al. | 137/551 |
| 2,715,009 | 8/1955 | Beekley | 251/61 |
| 2,759,487 | 8/1956 | Lornitzo | 251/282 |
| 2,762,204 | 9/1956 | Hanson | 62/3 |
| 2,850,037 | 9/1958 | Van Eysbergen | 137/477 |
| 2,878,828 | 3/1959 | Klafstad | 137/478 |
| 2,913,217 | 11/1959 | Russell | 251/46 |
| 2,925,987 | 2/1960 | Priesmeyer | 251/61 |
| 3,026,081 | 3/1962 | Rossi | 251/214 |
| 3,027,916 | 4/1962 | Smith | 137/557 |
| 3,131,609 | 5/1964 | Dobrikin et al. | 92/63 |
| 3,175,473 | 3/1965 | Boteler et al. | 92/128 |
| 3,188,048 | 6/1965 | Sutherland | 92/168 |
| 3,206,165 | 9/1965 | Salmon et al. | 251/335 B |
| 3,279,495 | 10/1966 | Taylor | 137/454.6 |
| 3,319,649 | 5/1967 | Cummins | 137/505.18 |
| 3,331,583 | 7/1967 | Baker | 251/63.5 |
| 3,391,899 | 7/1968 | Wilson | 251/26 |
| 3,392,956 | 7/1968 | DeFrees | 251/144 |
| 3,627,257 | 12/1971 | Stampfli | 251/129 |
| 3,787,023 | 1/1974 | Shufflebarger et al. | 251/335 B |
| 3,838,707 | 10/1974 | Wachowitz, Jr. | 137/312 |
| 3,844,307 | 10/1974 | Soury | 137/271 |
| 3,888,280 | 6/1975 | Tartaglia | 137/630.13 |
| 4,054,156 | 10/1977 | Benson | 251/63.6 |
| 4,069,747 | 1/1978 | Forry et al. | 92/166 |
| 4,201,366 | 5/1980 | Danko et al. | 251/335 B |
| 4,211,387 | 7/1980 | Getchell et al. | 251/335 B |
| 4,237,920 | 12/1980 | Norman | 251/335 B |
| 4,258,902 | 3/1981 | Liebert et al. | 251/214 |
| 4,270,727 | 6/1981 | Norman | 251/63.4 |
| 4,285,495 | 8/1981 | King | 251/63.5 |
| 4,305,423 | 12/1981 | Adler | 137/505.13 |
| 4,335,744 | 6/1982 | Bey | 137/522 |
| 4,356,833 | 11/1982 | Mayfield, Jr. et al. | 137/62 |
| 4,410,003 | 10/1983 | Sandling | 137/312 |
| 4,470,430 | 9/1984 | Lancaster | 251/291 |

FOREIGN PATENT DOCUMENTS

| 674901 | 4/1939 | Fed. Rep. of Germany . | |
| 1920617 | 4/1969 | Fed. Rep. of Germany . | |
| 1924476 | 11/1970 | Fed. Rep. of Germany | 251/335 B |
| 986737 | 3/1949 | France . | |
| 1249395 | 11/1959 | France . | |
| 562393 | 6/1944 | United Kingdom | 251/335 B |

OTHER PUBLICATIONS

"All–Metal Bellows Valve", Shpil'raen et al, Industrial Lab (USA), vol. 42, No. 6, Jun. 1976.

Primary Examiner—A. Michael Chambers
Attorney, Agent, or Firm—Fay, Sharpe, Fagan, Minnich & McKee

[57] ABSTRACT

An inverted bellows valve has a two-piece stem interconnecting the valve and actuator for reciprocating axial movement of the stem tip. Tapered surfaces are advantageously utilized between cooperating elements for self-centering the valve assembly. An annular gland disposed along the exterior of the valve stem has concentric inner and outer O-rings which permit the stem to float and compensate for misalignment. A wobble collar is also disposed in abutting engagement with the stem to compensate for uneven spring forces which could otherwise cock the stem. The bellows subassembly is removable in one piece to facilitate maintenance and replacement.

15 Claims, 1 Drawing Figure

U.S. Patent    Jan. 6, 1987    4,634,099
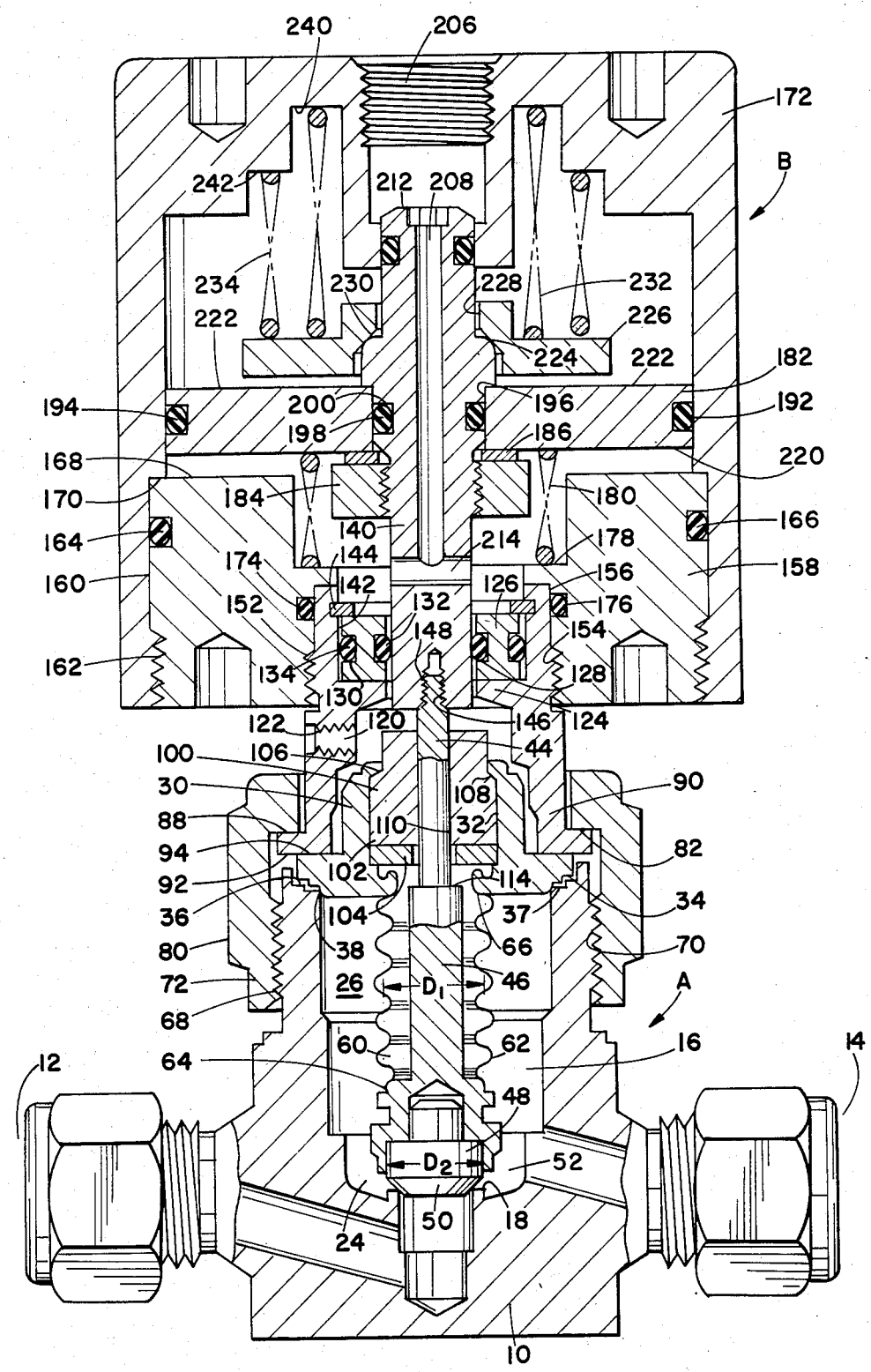

HIGH PRESSURE INVERTED BELLOWS VALVE

BACKGROUND OF THE INVENTION

This invention pertains to the art of valves and more particularly to valves of the type commonly referred to as bellows valves. The invention is particularly applicable to an inverted bellows valve and will be described with particular reference thereto. However, it will be appreciated that the invention has broader applications and is adaptable to use in other environments and applications.

Increased use of bellows valves has been fostered by the need to seal the valve interior from the external environment as may, for example, be encountered in special handling of corrosive type fluids. The term inverted bellows refers to the fact that the bellows is sealed relative to the stem or stem tip such that the system fluid acts externally on the bellows, rather than internally. It has been found that the bellows in such valves can withstand greater external forces than internal forces, thus permitting use of inverted type bellows valves at higher system pressures. Many of the prior art devices have maximum pressure ratings of approximately 600 psi, and commonly assigned U.S. Pat. No. 4,201,366 has a pressure rating of 1000 psi maximum. Reliable shutoff operation under any condition of pressure or vacuum within its rating is also an important requirement along with decreased distortion of the bellows as it is cycled under pressure. Increased standards required for industrial utilization have not heretofore been met by the known prior art devices.

It has, therefore, been desirable to improve on the basic design whereby the valve structure would be capable of withstanding higher pressure applications without loss of quality in the valving assembly. The subject new design is deemed to meet these needs and others, and provide a new and improved inverted bellows capable of higher pressure ratings.

SUMMARY OF THE INVENTION

In accordance with the present invention, a bellows valve is provided having a valve body including an inlet passage, an outlet passage, a valve chamber in fluid communication with the inlet and outlet passages, and a valve seat in the valve chamber between the passages. A valve stem has a stem tip at one end thereof selectively cooperable with the valve seat for controlling fluid flow between the inlet and outlet passages, and a bellows sealingly surrounds a portion of the stem adjacent to the stem tip such that fluid pressure in the valve chamber exerts an external compressive force on the bellows. Means to compensate for misalignment of the stem is included to provide smoother movement along a longitudinal axis. This misalignment compensating means includes an annular gland having a pair of grooves adapted to receive inner and outer, concentric seal rings. The stem passes through the gland for abutting engagement with the inner seal ring whereby the interplay between the gland, seal rings, and the surrounding housing allows the valve stem to float and thereby compensate for misalignment of the stem relative to the bellows.

In accordance with another aspect of the invention, a closing ring forms a step seal with an outer, open end of the valve chamber. The bellows is sealingly secured at one end to the closing ring, and is similarly secured to the stem at the other end at an area adjacent to the stem tip. Use of the step seal ensures adequate sealing of the fluid within the valve chamber. A bushing is included in the closing ring and further assists in centering and guiding the valve stem. A bonnet cooperates with a retaining nut to forceably bring the bonnet and closing ring into close engagement with the valve body at the open end of the valve chamber. To further assist in axially aligning the stem, a tapered surface is included on the closing ring to assure a precise fit between the ring and valve body.

In accordance with another aspect of the invention, the stem comprises first and second threadedly connected coaxial portions. The threaded connection provides positive stem return as well as facilitating removal of the bellows subassembly in one piece for ease of maintenance and replacement. A fluid pressure actuator is included for urging the stem either axially inward or outward against the force of opposing spring biasing means. In the normally closed embodiment, the biasing force is provided by a pair of concentric, inner and outer helical springs which cooperate with a wobble collar. The wobble collar abuts the valve stem and includes a tapered inner surface to compensate for any uneven spring force which may arise.

In accordance with still another aspect of the invention, the actuator housing includes a closure member threadedly engaged therewith. The closure member has an opening adapted to receive the valve stem in conjunction with the bonnet. A close fitting tolerance between the closure member and the actuator housing maintains axial alignment of the actuator with respect to the remainder of the valve assembly.

A principal advantage of the present invention is the provision of a new inverted bellows valve useable at higher system pressures.

Another advantage of the invention resides in a structural arrangement which assures axial alignment of the various valve and valve actuator components.

A further advantage of the invention is found in providing a means compensating for misalignment of the valve stem.

Yet another advantage of the invention is the provision of a wobble collar which compensates for uneven spring forces and prevents eccentric loading of the valve stem.

Still further advantages and benefits of the subject invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawing wherein:

The FIGURE shows a side cross-sectional view of an inverted bellows valve constructed in accordance with the subject invention.

DETAILED DESCRIPTION OF THE PREFERRED EMBODIMENT

Referring now to the drawing wherein the showing is for purposes of illustrating a preferred embodiment of the invention only, and not for purposes of limiting same, a valve A is shown as having a valve actuator B disposed in operative relation thereto.

More particularly, valve A has a valve body 10 which includes an inlet passageway 12 and an outlet passageway 14. Suitable end fittings are provided on the valve body in surrounding relation to the outer ends of the passageways for connection with an external fluid system as is known. The inlet and outlet passageways communicate with a valve chamber 16 and an annular valve seat 18. The identification of passageways 12 and 14 as inlet and outlet, respectively, is for illustrative purposes only, and it will be understood by those skilled in the art that the designations may be reversed, or plural inlet and outlet passages may be used.

The valve chamber 16 has a closed end 24 in fluid communication with the inlet and outlet passages, and an open end 26. An annular closing ring 30 has a through passage 32 adapted to receive the valve stem as will be explained further hereinbelow. A stepped surface 34 along the outer periphery of the closing ring is designed for mating engagement with a stepped surface 36 at the open outer end of valve chamber 16 with a gasket 37 disposed therebetween. The stepped surfaces and gasket form what is commonly referred to as a step seal due to the mating surfaces 34, 36. The closing ring has an annular chamfered surface 38 disposed radially inward from the stepped surface 34. This chamfered or tapered surface ensures self centering of the ring with respect to the valve body during assembly.

A valve stem 44 has a first or lower portion 46 received in the valve chamber 16. One end of the first portion 46 receives a stem tip 48 which is constructed from KEL-F or any other suitable material to suit a particular valve application. Such other materials may advantageously be employed without in any way departing from the overall intent or scope of the invention. The stem tip is illustrated as having a tapered surface 50, although a ball tip or other configuration may be employed satisfactorily. When in the closed position, the stem tip 48 engages the valve seat 18 as shown to prevent fluid flow between inlet and outlet passageways 12, 14. An open position of the valve spaces the stem tip a predetermined distance from the valve seat whereby fluid communication occurs between the passageways 12, 14. As illustrated, there is a wide radial clearance generally designated 52 between the stem tip and the outlet passage. This clearance facilitates cleaning and prevents entrapment of process fluids as has been encountered in prior art devices. The valve may be easily purged and cleaned due to the presence of clearance 52.

A bellows 60 is constructed of stainless steel in the preferred embodiment and is pleated, or folded, as generally shown at 62 to accommodate selective axial movement of the stem. Bellows 60 may be welded or otherwise sealingly secured by convenient means to the first stem portion 46 at a peripheral area 64 located adjacent to the stem tip 48. The other end of the bellows is welded or otherwise secured to the closing ring 30 at an area generally designated 66. In this manner, the pressure of system fluid entering valve chamber 16 is sealingly isolated from the valve stem 44 by bellows 60. In the valve construction, it is important to maintain axial alignment of the bellows during stem movement since distortion of the bellows from an axial path will result in undue stresses, wearing, and premature failure of the bellows seal. Provisions for maintaining the necessary degree of axial alignment will be described hereinbelow in detail.

The mean diameter of the bellows D is substantially equal to the diameter D of the stem tip. Due to the equal diameters of the bellows and the stem tip, the valve is bidirectional. Bidirectional refers to the fact that either of passages 12, 14 may serve as the fluid pressure inlet of the valve. Preferably, passage 12 is the inlet so that if a bellows failure occurs, the valve may be closed and system fluid cannot enter the valve chamber. Therefore, since the valve can be pressurized from either passage, and function in an identical manner, it is considered bidirectional.

External threads 68 on valve body 10 engage threaded area 70 of a bonnet retaining nut 72. The retaining nut 72 has exterior polygonal surfaces 80 which define wrench flats for tightening the nut with respect to the valve body. A radially inward extending shoulder 82 on the nut cooperates with a radially outward extending flange 88 on a bonnet 90. A first end 92 of the bonnet abuts a radial face 94 of the closing ring so that the closing ring gasket and valve chamber stepped surfaces are tightly sealed with respect to one another when nut 72 is tightened.

The closing ring 30 also accommodates an elongated annular bushing 100 disposed in the through passage 32. Preferably, the bushing is constructed from bronze or some other suitable material. A first end 102 of the bushing abuts against a washer member 104, while an intermediate, notched area 106 engages a retaining lip 108 of the closing ring 30. The bushing has a cylindrical inner surface 110 which closely centers and guides the valve stem 44 along its first portion 46.

The washer is constructed of stainless steel and functions as a stop surface which cooperates with a shoulder 114 formed on the first stem portion. As the valve stem is actuated to an open position, the washer 104 and shoulder 114 abut one another defining the uppermost limit of axial movement of the valve stem.

A test port 120 is provided in the bonnet 90 adapted to receive a tube connection (not shown). The test port is used to monitor the valve assembly and allow detection of whether any fluid from the valve is bypassing the step seal or bellows seal so that appropriate corrective measures may be taken. A threaded portion 122 of the test port permits threaded engagement of an appropriate tube connection.

The bonnet 90 has a radially inward extending support flange 124 which supports a means to compensate for misalignment. The misalignment compensating means includes an annular gland 126 having an inner groove 128 and an outer groove 130. These grooves are adapted to receive an inner O-ring 132 and an outer O-ring 134, respectively. The inner O-ring 132 contacts a second or upper stem portion 140. The outer O-ring 134 cooperates with an interior surface 142 of the bonnet. Utilization of the annular gland 126 with the plural O-rings in inner and outer grooves 128, 130 compensates for any misalignment of the valve stem since the gland and O-rings permit floating. The gland is designed to loosely receive the second stem portion, the gland, in turn, being loosely received by the bonnet. The O-rings deform to stabilize the axial position of the second stem portion 140. A retaining ring 144 maintains the compensating means axially positioned along the interior surface 142 of the bonnet and support flange 124.

The second stem portion 140 includes inner threads 146 cooperable with exterior threads 148 at the outermost end of the first stem portion 46. The threaded connection provides positive valve stem return during axial stem movement. The first and second stem portions also have mating close fitting internal and external diameters. These close fitting diameters ensure precise axial alignment of the plural stem portions during initial assembly, or at the time of reassembly after maintenance. Use of a threaded connection between the two stem portions facilitates selective removal of the bellows subassembly in one piece without causing any distortion to the desired axial movement of the bellows.

The exterior of the bonnet is provided with a threaded portion 152 which, in turn, engages a threaded area 154 of an opening 156 in an actuator closure member or base 158. The actuator closure member has an outer peripheral surface 160 which includes a threaded region 162 and a groove 164 adapted to receive a seal ring 166. An axial end face 168 of the actuator closure member cooperates with an axial shoulder 170 of the actuator housing, defining the innermost insertion of the closure member. A groove 174 and associated seal member 176 provide a fluid tight seal between the actuator closure member or base and the exterior of the bonnet.

An inner shoulder 178 is provided on closure member 158 to receive one end of a spring 180 in one version of the valve. Spring 180 has been shown in phantom since it is used in an alternate, normally open embodiment of the valve as will be readily understood by those skilled in the art. The alternate, normally open embodiment will be described hereinbelow in greater detail.

An actuator 182, specifically shown as a piston, is disposed on the second stem portion 140. Other actuators may be employed with equal success. A nut 184 and washer 186 are provided on the second stem portion 140 for retaining this piston in fixed relation to the stem. Piston 182 sealingly engages the actuator housing 172 by means of an O-ring 192 which is received in an outer peripheral groove 194 in the piston. The inner periphery 196 of the piston is disposed in close-spaced relation to an O-ring 198 received in a peripheral groove 200 included in the second stem portion.

Fluid pressure may be supplied to the interior of the actuator through opening 206 which is illustrated as being in fluid communication with an axial fluid passage 208 provided in the second stem portion 140. Alternatively, the second stem portion may be of a solid conformation with a suitable fluid opening being provided through the actuator housing in a different manner. The stem fluid passage 208 extends from a stem outermost end 212 to a transverse bore 214 located toward the inner end of the second stem portion 140. In this manner, fluid pressure may selectively be directed to an inner face 220 of the piston for axially driving the piston against an opposed, spring biasing force directed against a piston outer face 222. A curvilinear surface 224 on the second stem portion 140 cooperates with a through opening in a wobble collar 226 to compensate for uneven forces exerted by the spring biasing means.

More specifically, the wobble collar 226 has an enlarged through passage 228 which loosely receives the second stem portion 140. A tapered surface 230 engages the curvilinear portion 224 of the second stem portion so that the wobble collar may assume limited angular positions with respect to the stem axis and thereby compensate for uneven forces exerted by springs 232, 234. In the preferred construction, these springs are helical in nature and are concentrically arranged so that one end abuts the wobble collar while the other ends engage annular shoulders 240, 242 in cap 172. A pair of springs is used for the normally closed embodiment since large biasing forces are required for high pressure applications.

The alternate, normally open embodiment has one end of spring 180 abutting an inner shoulder 178 on closure member 158. The other end of the spring 180 abuts the piston actuator 182. The transverse bore 214 is placed at an alternative axial location for providing fluid pressure against the piston outer face 222. This alternative, normally open embodiment would utilize fluid pressure applied to the piston outer face 222 to overcome the biasing force exerted by spring 180. Only a single spring is required in the alternate embodiment because of the high fluid system pressure in the valve chamber. It will be understood that the springs 180, 232, 234 are not simultaneously used but, instead, are incorporated in the alternative embodiments.

All metal, wetted parts of the inverted bellows valve are preferably constructed of 316 stainless steel, including the bellows itself. The second or upper stem portion may be constructed of hardenable stainless steel while the remaining actuator structure is aluminum. As previously indicated, the stem tip is made of a soft material such as KEL-F which securely seals with the valve seat. However, the foregoing materials are merely exemplary, and other materials may be suitably employed without in any way departing from the inventive concept involved.

The subject new development incorporates a tapered, self-centering surface in addition to the wobble collar and misalignment compensating means. The tapered surface assures axial alignment of two major components which, in turn, allow accurate axial movement of the bellows. The wobble collar ensures that uneven forces due to the use of the plural concentric springs are not transferred to the valve stem. In like manner, the gland with plural concentric O-rings allows the stem to float and thereby compensate for any misalignment. Bushing 100 is located outside the system fluid for centering and guiding of the valve stem, and the threaded interconnections between selected components facilitate ready disassembly and maintenance of the valve. The interaction of these various features provides an inverted bellows valve assembly capable of withstanding pressures reaching 3500 psi.

The invention has been described with respect to the preferred embodiment. Obviously, modifications and alterations will occur to others upon the reading and understanding of the specification. It is intended to include all such modifications and alterations are insofar as they come within the scope of the appended claims or the equivalents thereof.

Having thus described the invention, it is now claimed:

1. A bellows valve comprising:
   a valve body having an inlet passage, an outlet passage, a valve chamber in fluid communication with said passages, and a valve seat interposed between said passages;
   a stem including first and second coaxial portions, one end of said first stem portion being selectively cooperable with said valve seat for controlling fluid flow between said passages;
   a bellows surrounding a portion of said first stem portion and sealingly isolating said stem from system fluid passing through said valve chamber, whereby the system fluid is adapted to exert an external compressive force on said bellows;

said valve chamber having an open end adapted to receive said first stem portion;

an actuator housing removably connected to said valve body, said actuator housing receiving means cooperating with said stem second portion for reciprocating said second stem portion in a first direction in response to first force means for shifting said first stem portion one end into sealing relation with said valve seat and in a second direction in response to second force means for shifting said first stem portion one end to a non-sealing relation with said valve seat, one of said force means including means compensating for uneven force generated thereby for preventing eccentric loading of said stem.

2. The bellows valve as defined in claim 1 wherein said reciprocating means comprises a piston closely received in said actuator housing, at least one of said first and second force means comprising fluid pressure selectively introduced into said actuator housing.

3. The bellows valve as defined in claim 1 wherein one of said first and second force means comprises spring biasing means, said one force means adapted to selectively overcome said other force means to effect shifting of said first stem portion one end from one of said sealing and non-sealing relations to the other.

4. The bellows valve as defined in claim 1 further including means compensating for misalignment of said stem whereby axial movement of said stem is smoothly guided along a longitudinal axis.

5. The bellows valve as defined in claim 4 wherein said misalignment compensating means includes an annular gland having inner and outer grooves accommodating a pair of inner and outer resilient rings, respectively, said inner ring being in engaging relation with said stem for permitting the stem to float.

6. A bellows valve comprising:
a valve body having an inlet passage, an outlet passage, a valve chamber in fluid communication with said passages, and a valve seat disposed between said passages;
a valve assembly in operative engagement with said valve chamber and an actuator housing, said valve assembly including a valve stem having a stem tip at one end, said stem tip for selective sealing engagement with said valve seat for controlling fluid flow between said inlet and outlet passages;
said stem including first and second threadedly engaged coaxial portions;
a bellows surrounding part of said stem and sealingly isolating said stem from system fluid passing through said chamber, whereby the system fluid is adapted to exert an external compressive force on said bellows;
said valve chamber has an open end adapted to receive said first stem portion, a closing ring forming a step seal with said valve chamber open end, said bellows being disposed in sealing engagement with said first stem portion adjacent an inner end thereof and with the other end of said bellows being disposed in sealing engagement with said closing ring for sealingly isolating said stem;
a bonnet in abutting relation with said closing ring at one end, a port opening to accommmodate monitoring of the sealing integrity of said bellows, an annular gland received at the other end, and an exterior threaded portion engaging an actuator housing closure member;

said annular gland including inner and outer grooves receiving inner and outer concentric seal rings respectively, for permitting the stem to float;
said actuator housing closure member having an opening, said valve stem axially extending through said closure member opening and into said housing;
said actuator housing including a fluid operated spring biased actuator operatively engaging said valve stem for reciprocating axial movement of said stem, said spring interposed between said housing and a wobble collar wherein said wobble collar has a tapered edge located in abutting relation with said stem for preventing eccentric loading of said stem due to uneven spring forces.

7. A bellows valve comprising:
a valve body having an inlet passage, an outlet passage, a valve chamber in fluid communication with said passages, and a valve seat disposed between said passages;
a valve assembly in operative engagement with said valve chamber and an actuator housing, said valve assembly including a valve stem having a stem tip at one end thereof for selective sealing engagement with said valve seat to control fluid flow between said inlet and outlet passages;
a bellows surrounding a portion of said stem and being sealingly secured at the opposite ends thereof to said valve for isolating said stem from fluid passing through said valve chamber, whereby the fluid exerts an external compressive force on said bellows;
said stem including first and second portions with said second portion being in operative engagement with an actuator for effecting selective reciprocating movement of said valve stem; and,
means compensating for misalignment of said stem including an annular gland having inner and outer grooves receiving inner and outer concentric seal rings, respectively, said inner and outer seal rings each being radially compressed and said inner seal ring being disposed in engaging relation with said stem for permitting the stem to float, whereby axial movement of said stem is smoothly guided along a longitudinal axis.

8. A bellows valve comprising:
a valve body having an inlet passage, an outlet passage, a valve chamber in fluid communication with said passages, and a valve seat disposed between said passages;
a valve assembly in operative engagement with said valve chamber and an actuator housing, said valve assembly including a valve stem having a stem tip at one end thereof for selective sealing engagement with said valve seat to control fluid flow between said inlet and outlet passages;
a bellows surrounding a portion of said stem and being sealingly secured at the opposite ends thereof to said valve for isolating said stem from fluid passing through said valve chamber, whereby the fluid exerts an external compressive force on said bellows;
said stem including first and second portions with said second portion disposed in operative engagement with an actuator for effecting selective reciprocating movement of said valve stem; and,
said valve chamber having an open end receiving said stem first portion, a closing ring forming a step seal with said valve chamber open end, said closing ring step seal including a plurality of axially disposed surfaces having varying radial dimensions, and one end of said bellows being disposed in sealing engagement with said stem first portion adjacent an inner end thereof with the other end of said bellows being disposed in sealing engagement with said closing ring for sealingly isolating said stem.

9. The bellows valve as defined in claim 8 wherein said closing ring is annularly shaped for receiving said valve stem and includes an elongated bushing in surrounding relation to said stem to effect stem centering and guiding.

10. The bellows valve as defined in claim 8 wherein said closing ring includes a tapered surface for centering said ring and bellows relative to said valve chamber open end.

11. The bellows valve as defined in claim 8 wherein said closing ring matingly receives a bonnet on a face opposed to said valve chamber, a retaining nut cooperating with said bonnet and valve body for urging said closing ring into a close sealed relationship with said valve body at said valve chamber open end.

12. The bellows valve as defined in claim 11 wherein said bonnet has a port opening to accommodate monitoring of the sealing integrity of said bellows.

13. A bellows valve comprising:
a valve body having an inlet passage, an outlet passage, a valve chamber in fluid communication with said passages, and a valve seat disposed between said passages;
a valve assembly in operative engagement with said valve chamber and an actuator housing, said valve assembly including a valve stem having a stem tip at one end thereof for selective sealing engagement with said valve seat to control fluid flow between said inlet and outlet passages;
a bonnet operatively disposed between said valve body and said actuator housing and receiving said valve stem therethrough;
a bellows surrounding a portion of said stem and being sealingly secured at the opposite ends thereof to said valve for isolating said stem from fluid passing through said valve chamber whereby the fluid exerts an external compressive force on said bellows;
said stem including first and second portions with said second portion being in operative engagement with an actuator for effecting selective reciprocating movement of said valve stem; and,
means compensating for misalignment of said stem received in said bonnet, said misalignment compensating means including an annular gland having inner and outer grooves receiving inner and outer concentric seal rings, respectively, said inner seal ring being disposed in engaging relation with said stem for permitting the stem to float, said outer seal ring being disposed in engaging relation with said bonnet whereby axial movement of said stem is smoothly guided along a longitudinal axis.

14. A bellows valve comprising:
a valve body having an inlet passage, an outlet passage, a valve chamber in fluid communication with said passages, and a valve seat interposed between said passages;
a stem including first and second coaxial portions, one end of said first stem portion being selectively cooperable with said valve seat for controlling fluid flow between said passages;
a bellows surrounding a portion of said first stem portion and sealingly isolating said stem from system fluid passing through said valve chamber whereby the system fluid is adapted to exert an external compressive force on said bellows;
said valve chamber having an open end adapted to receive said first stem portion; and,
an actuator housing removably connected to said valve body, said actuator housing receiving means cooperating with said stem second portion for reciprocating said second stem portion in a first direction in response to spring biasing means for shifting said first stem portion one end into sealing relation with said valve seat and in a second direction in response to second force means for shifting said first stem portion one end to a non-sealing relation with said valve seat, said spring biasing means including a wobble collar compensating for uneven spring force, said spring biasing means being interposed between said housing and said wobble collar with said wobble collar located in abutting relation with said second stem portion, said wobble collar including a tapered inner surface cooperating with a curvilinear portion on said second stem portion.

15. The bellows valve as defined in claim 14 wherein said spring biasing means comprises a pair of concentrically arranged springs interposed between said housing and said wobble collar.

* * * * *